(12) United States Patent
Fu et al.

(10) Patent No.: US 9,817,134 B1
(45) Date of Patent: Nov. 14, 2017

(54) UNIVERSAL READOUT FOR LIGHT-SHARING DETECTOR

(71) Applicant: GENERAL ELECTRIC COMPANY, Schenectady, NY (US)

(72) Inventors: Geng Fu, Rexford, NY (US); Floribertus P M Heukensfeldt Jansen, Ballston Lake, NY (US); Hua Qian, Clifton Park, NY (US); Xiao Jin, Brookfield, WI (US); Jianjun Guo, Ballston Spa, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 15/262,477

(22) Filed: Sep. 12, 2016

(51) Int. Cl.
*G01T 1/20* (2006.01)

(52) U.S. Cl.
CPC ................... *G01T 1/2018* (2013.01)

(58) Field of Classification Search
CPC .................................................. G01T 1/2018
See application file for complete search history.

(56) References Cited

U.S. PATENT DOCUMENTS

| | | | |
|---|---|---|---|
| 5,504,334 A | 4/1996 | Jansen et al. | |
| 8,063,377 B2 | 11/2011 | Schulz | |
| 8,294,110 B2 | 10/2012 | Burr | |
| 8,849,002 B2 | 9/2014 | Chinn et al. | |
| 9,151,847 B2 | 10/2015 | Levin et al. | |
| 9,304,211 B2 | 4/2016 | Goertzen | |
| 2012/0068077 A1* | 3/2012 | Frach | A61B 6/037 250/369 |
| 2014/0061482 A1* | 3/2014 | Wear | G01T 1/2018 250/362 |
| 2014/0183339 A1* | 7/2014 | Dolinsky | G01T 1/2018 250/208.2 |
| 2014/0224963 A1* | 8/2014 | Guo | G01T 1/2985 250/208.1 |
| 2015/0001403 A1* | 1/2015 | Kim | G01T 1/2985 250/363.03 |
| 2015/0108328 A1* | 4/2015 | Guo | H04N 5/361 250/208.1 |
| 2016/0170045 A1* | 6/2016 | Kim | G01T 1/2018 250/208.1 |
| 2016/0191829 A1* | 6/2016 | Guo | G01T 1/2018 348/301 |

FOREIGN PATENT DOCUMENTS

WO   2015081134 A2   6/2015

OTHER PUBLICATIONS

Xiao-Hui et al., "Design and development of compact readout electronics with silicon photomultiplier array for a compact imaging detector", Chinese Physics C, vol. 36, Issue 10, pp. 973-978, Oct. 2012.

(Continued)

*Primary Examiner* — Mark R Gaworecki
(74) *Attorney, Agent, or Firm* — Pabitra K. Chakrabarti (57) ABSTRACT

Embodiments of the invention are utilized to improve the timing performance of SiPM based PET detectors with light-sharing configuration. The universal readout design utilizes adaptive group readout to process noisy and slow signals generated by SiPM devices, and provides enhanced timing capabilities with simplified readout electronics.

21 Claims, 7 Drawing Sheets

(56) References Cited

OTHER PUBLICATIONS

Qi et al., "Performance comparison of two compact multiplexed readouts with SensL's SPMArray4 for high-resolution Detector module", Nuclear Science Symposium and Medical Imaging Conference (NSS/MIC), 2012 IEEE, pp. 455-457, Oct. 27, 2012-Nov. 3, 2012.

Kang et al., "PET Detector Configuration with Thick Light Guide and GAPD Array Having Large-Area Microcells", pp. 1-5, http://miil.stanford.edu/publications/files/155_PUB.pdf.

\* cited by examiner

UNIVERSAL READOUT FOR LIGHT-SHARING DETECTOR

FIELD

The subject matter disclosed herein relates to medical imaging, particularly as it relates to a readout design for detectors with light-sharing configurations.

BACKGROUND

Figure 1:
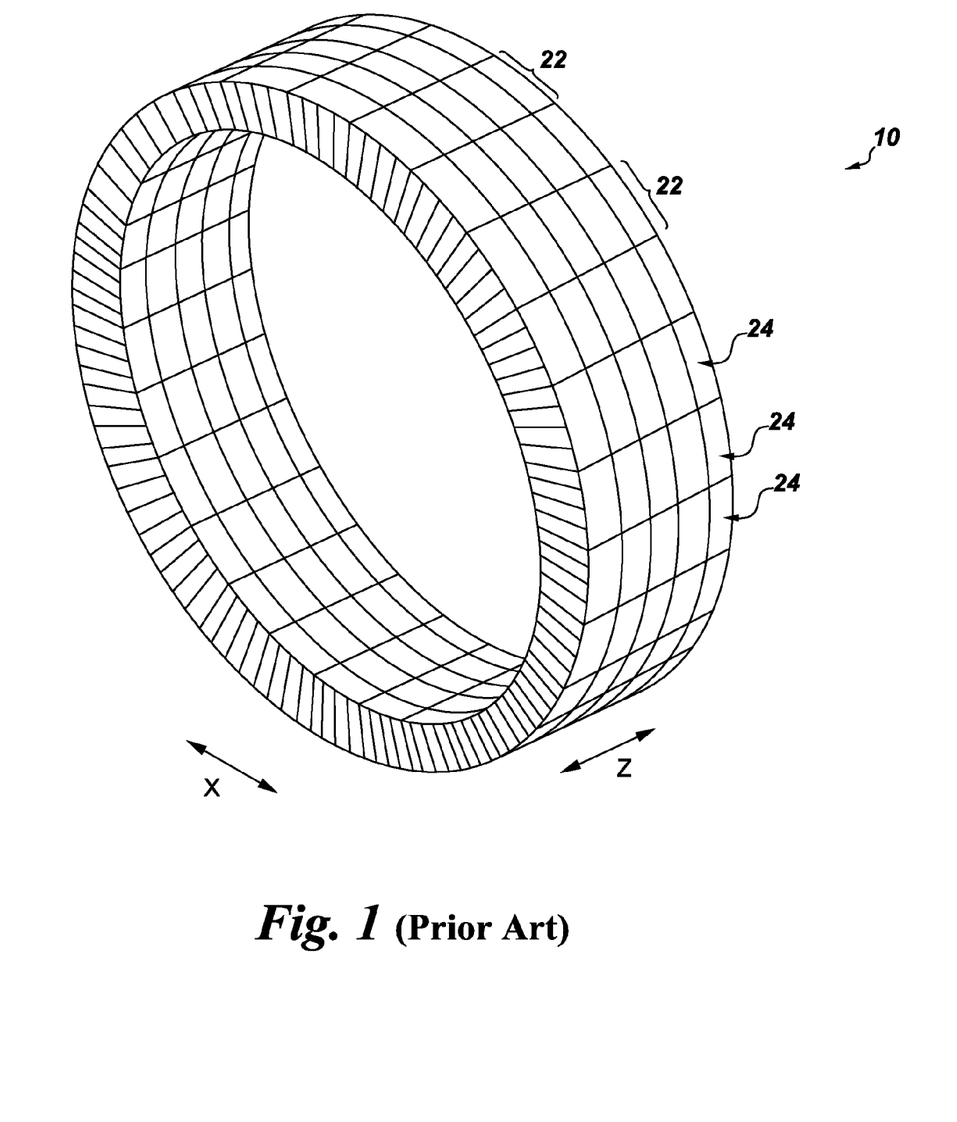
FIG. 1 (PRIOR ART) depicts a PET detector assembly.

Gamma ray detectors may be used in different applications, such as in positron emission tomography (PET) systems. PET systems perform nuclear medicine imaging that generates a three-dimensional image of functional processes within a body. For example, a PET system generates images that represent the distribution of positron-emitting nuclides within the body of a patient. When a positron interacts with an electron by annihilation, the entire mass of the positron-electron pair is converted into two 511 keV (i.e., annihilation) photons. The photons are emitted in opposite directions along a line of response. The annihilation photons can be detected by detectors that are placed along the line of response on a detector ring. As shown in FIG. 1 (PRIOR ART), a PET detector 10 includes a plurality of modules 22 that are arranged in a ring. Each detector module 22 is assembled from a plurality of detector units, or blocks 24. When the annihilation photons arrive and are detected at the detector blocks at the same time, this is referred to as coincidence. An image is then generated based on the acquired photon detection data that includes the annihilation photon detection information.

Recently, the silicon photomultiplier (SiPM) has been widely used in PET. The SiPMs are tiled arrays of up to tens of thousands of avalanche photodiodes of typical size between about 10 microns to about 100 microns, connected in parallel on a common silicon substrate and working on common load. The output of an SiPM device is typically connected to a buffer amplifier, which can be implemented as a transimpedance amplifier. Compared to a conventional vacuum photomultiplier tube (PMT), the SiPM has the advantages of compact size and allowing mass production with reduced variability and lower cost per unit of photosensitive area. Other superior characteristics are related to operation and performance, such as higher photon detection efficiency (PDE), lower bias voltage, better timing resolution, and insensitivity to magnetic fields. However, the SiPM has the disadvantages of higher dark count rate, slower fall time of output pulse relative to the PMT, and signal-correlated spurious effects such as cross-talk and after-pulsing. These effects are cumulative with the number of SiPM devices connected into a PET detector block, and result in significant timing resolution degradation as the block size is increased.

In the detector block, the crystal is optically coupled to the SiPMs. For the detector design with the scintillator crystal directly coupling to the SiPM device and 1-to-1 readout, the minimal loss and propagation of optical photons between the scintillator and the SiPM, and negligible crosstalk among SiPM devices results in better timing performance. The detector, however, requires numerous readout channels, as well as consumes a significant amount of power to incorporate complete readout electronics for each SiPM. It is thus very complex, difficult, and expensive to implement.

In addition, a fraction of the incident 511 keV annihilation photons produce multiple interactions in multiple crystals and thus readout channels of the corresponding SiPMs due to Compton scattering or optical photon spreading between crystals (light sharing). In a PET detector, high sensitivity is necessary for obtaining images with reasonable signal-to-noise ratio (SNR). The sensitivity of a PET scanner is primarily determined by the efficiency of the detection system (e.g. crystal thickness and the solid angle coverage). An enhanced detection system is needed that recovers Compton scattering events or light-sharing events in the scintillation block while maintaining good timing resolution. The following disclosure will address the needs as described above to provide an improved timing performance and detection efficiency. Aspects of the invention will process noisy and slow signals generated by SiPM devices, and greatly reduce the number of electronic channels to bring down the cost while offering excellent timing capabilities, e.g. sub-250 ps for time of flight positron emission tomography (TOF-PET).

SUMMARY

The above and other drawbacks or deficiencies may be overcome or alleviated by development of a system as described as follows.

The invention discloses a universal readout design for SiPM-based detector with light-sharing configuration, which provides high light compression ratio to reduce the cost of the SiPM, while maintaining excellent timing performance with highly multiplexed and simplified electronics. The invention addresses the drawbacks as currently faced in the art in order to reduce the dark noise and signal-correlated spurious effects in comparison to a conventional photomultiplier (PM) tube.

The group readout design provides the timing information with reduced contribution of electronic noise, dark noise and optical crosstalk from other channels, and thus offers excellent timing resolution. In addition, in one embodiment, the group multiplexing of the SiPM devices matches with a crystal light-sharing configuration and is adaptively controlled in analog domain to derive an improved signal noise ratio.

In one embodiment, a silicon photomultiplier (SiPM) based detection system includes a universal readout design with a light-sharing configuration. The detection system comprises: one or more SiPMs positioned in respect to one or more scintillation crystals to form a scintillation block, wherein the SiPMs detect an annihilation photon interaction in one or more of the scintillation crystals and produce one or more signals; a front end circuit including a plurality of buffer amplifiers, each buffer amplifier in communication with at least one respective SiPM to relay one or more of the signals to a plurality of group readout units; a block readout circuit coupled to the front end circuit, the block readout circuit of which selectively sums the signals from the plurality of buffer amplifiers; a control and processing logic unit which provides a control signal to the front end circuit, the group readouts, and the block readout circuit, alone or in combination, and which performs a time stamp estimation utilizing the one or more signals from each of the group readout units and block readout circuit, alone or in combination; wherein the signals from one or more of the buffer amplifiers are summed by way of a summer and provide a timing signal and an energy signal that represent the annihilation photon interaction in the group readout unit; and wherein the block readout circuit utilizes a summation of signals to provide a block timing signal, a block energy signal, and a position which represent the annihilation photon interaction in the scintillation block.

One embodiment includes a group readout unit including an adaptive switch array to adaptively select signals from one or more selected buffer amplifiers. In one aspect, the timing signal is a time indication of an annihilation photon detected by selected SiPMs. In another aspect, the energy signal provides a total energy deposition of annihilation photon interaction detected by selected SiPMs. Embodiments can also include a block readout circuit that comprises a weighted summer which sums the signals from the plurality of buffer amplifiers and provides a summed timing signal to a timing channel, a summed energy signal to an energy channel, and a weighted sum signal to a position channel; wherein the timing channel has a timing output that is a time indication of an annihilation photon interaction detected in the scintillation block; the energy channel provides an energy output that is a total energy deposition of an annihilation photon interaction detected in the scintillation block; and the position channel has an output signal that represents at least a two-dimensional position of the annihilation photon interaction detected in the block. The SiPMs can be divided into a plurality of groups, each of the groups corresponding with multiple optically-coupled scintillation crystals and connected to a respective group readout circuit. The selected buffer amplifiers in a group readout unit are determined based on optical photon distribution of the annihilation photon interaction detected in the scintillation block.

In another embodiment, the readout electronic apparatus comprises: a plurality of group readout units that receive signals from an arrangement of silicon photomultipliers (SiPMs) in combination with respective buffer amplifiers at a front end circuit, the SiPMs optically coupled to an array of scintillation crystals and which detect at least one annihilation photon event in one or more of the scintillation crystals; a block readout circuit coupled to the front end circuit, the block readout of which selectively sums the signals from the SiPMs; a control and processing logic unit which provides a control signal to the front end circuit, the group readout units, and the block readout circuit, alone or in combination, and which performs a time stamp estimation utilizing one or more of the signals from each of the group readout units and block readout circuit, alone or in combination; wherein the group readout unit comprises a summer to selectively sum the signals and provide a group timing signal and a group energy signal that represent the annihilation photon event and wherein the block readout circuit utilizes a selective summation of signals to provide a block timing signal, a block energy signal, and a position which represents the annihilation photon event. The group readout unit may also comprise one or more adaptive switches to adaptively select signals from one or more selected buffer amplifiers. Further, the selection SiPMs and buffer amplifiers in the group readout unit can be determined by a count rate of the annihilation photon event.

In one aspect of the readout electronic apparatus, the group readout unit selects a fewer number of SiPMs and corresponding buffer amplifiers when the count rate has a specified high count rate; and the group readout unit selects a larger number of SiPMs and corresponding buffer amplifiers the count rate has a specified low count rate. In addition, the control and processing logic unit performs at least one time stamp estimation to determine timing of the annihilation photon event. The summed energy signal of the block readout circuit indicates an energy level of the annihilation photon event, and the group readout unit comprises an energy channel that represents a summed deposition of energy in an individual group readout unit.

Embodiments of the invention include a method of providing universal readout in a silicon photomultiplier (SiPM) based detector, the method comprising: detecting a radiation event using one or more silicon photomultipliers (SiPMs) in a scintillation block; determining, by way of a processor, if the radiation event is a single group event or a multiple group event; obtaining one or more time stamps from one or more timing signals of the single group event or the multiple group event and recording inputs in a look-up table, the inputs comprising (i) an energy distribution, (ii) a spatial distance between one or more single or multiple group events, and (iii) an observed time difference between the events; determining, by way of the look-up table, a number of inputs and set of values including a weighting factor; calculating weighted time values which, by way of the look-up table, create an optimized mean of the time stamps.

In one aspect, during the step of calculating the weighted time values, an energy disposition associated with each of the single or multiple group events is estimated, and the optimized mean of the time stamps is weighted by an inverse of each respective group variance.

A non-transitory computer readable medium herein described comprises computer-readable instructions stored therein for causing a control processor to perform operations to determine timing, energy, and a position in a group readout configuration, the operations comprising: detecting a radiation event using one or more silicon photomultipliers (SiPMs) in a scintillation block; determining, by way of a processor, if the radiation event is a single group event or a multiple group event; obtaining one or more time stamps from one or more timing signals of the single group event or the multiple group event and recording inputs in a look-up table, the inputs comprising (i) an energy distribution, (ii) a spatial distance between one or more single or multiple group events, and (iii) an observed time difference between the events; determining, by way of the look-up table, a number of inputs and set of values that optimize the timing signals; calculating weighted time values which, by way of the look-up table, create an optimized mean of the time stamps. In one aspect, a select number of inputs and set of values may be utilized.

Variations can thus be designed to accommodate different size, shapes, groups, and structures such that the methods can be accomplished in a cost-effective efficient manner. The structural system, unit, channel, and circuit terms may be interchangeable, though functionality is depicted as shown in the detailed description and drawings.

DETAILED DESCRIPTION

Various embodiments will be described more fully hereinafter with reference to the accompanying drawings. Such embodiments should not be construed as limiting. For example, one or more aspects can be utilized in other embodiments and even other types of devices. Referring to the drawings in general, it will be understood that the illustrations are for the purpose of describing particular embodiments and are not intended to be limiting.

An array of silicon photomultipliers (SiPMs) has been widely used in positron emission tomography (PET). The invention addresses issues in reference to the higher dark noise and slow signal of SiPM device in comparison to a conventional photomultiplier tube (PMT).

Embodiments of the invention herein disclosed are related to a universal readout system design for an SiPM-based light sharing detector. The system comprises an adaptive group readout to provide good timing performance with a highly multiplexed signal to reduce the overall cost.

The group readout design provides timing signal with reduced contribution of electronic noise, dark noise, and optical crosstalk from other channels (i.e., groups), and thus offers improved timing resolution. The adaptive multiplexing of the group readout can match the crystal light-sharing configuration and be controlled in analog domain to derive the enhanced SNR and reasonable ratio of single group events.

Additionally, the methods disclosed in embodiments herein process noisy and slow signals generated by an SiPM device, and greatly reduce the number of electronic channels to bring down the cost while offering desired timing resolution (e.g. sub-250 ps for TOF-PET).

Embodiments herein describe a detector block, where a number of SiPM devices are divided into several groups. Each group corresponds to multiple optically coupled crystals. The signals from each SiPM in the group are summed together, and then the group readout provides the summed signal to both timing and energy channels. In a light-sharing detector, the optical photons are shared by multiple SiPMs. In one aspect, the group readout architecture is designed to match the optical-coupling configuration in the block.

Figure 2:
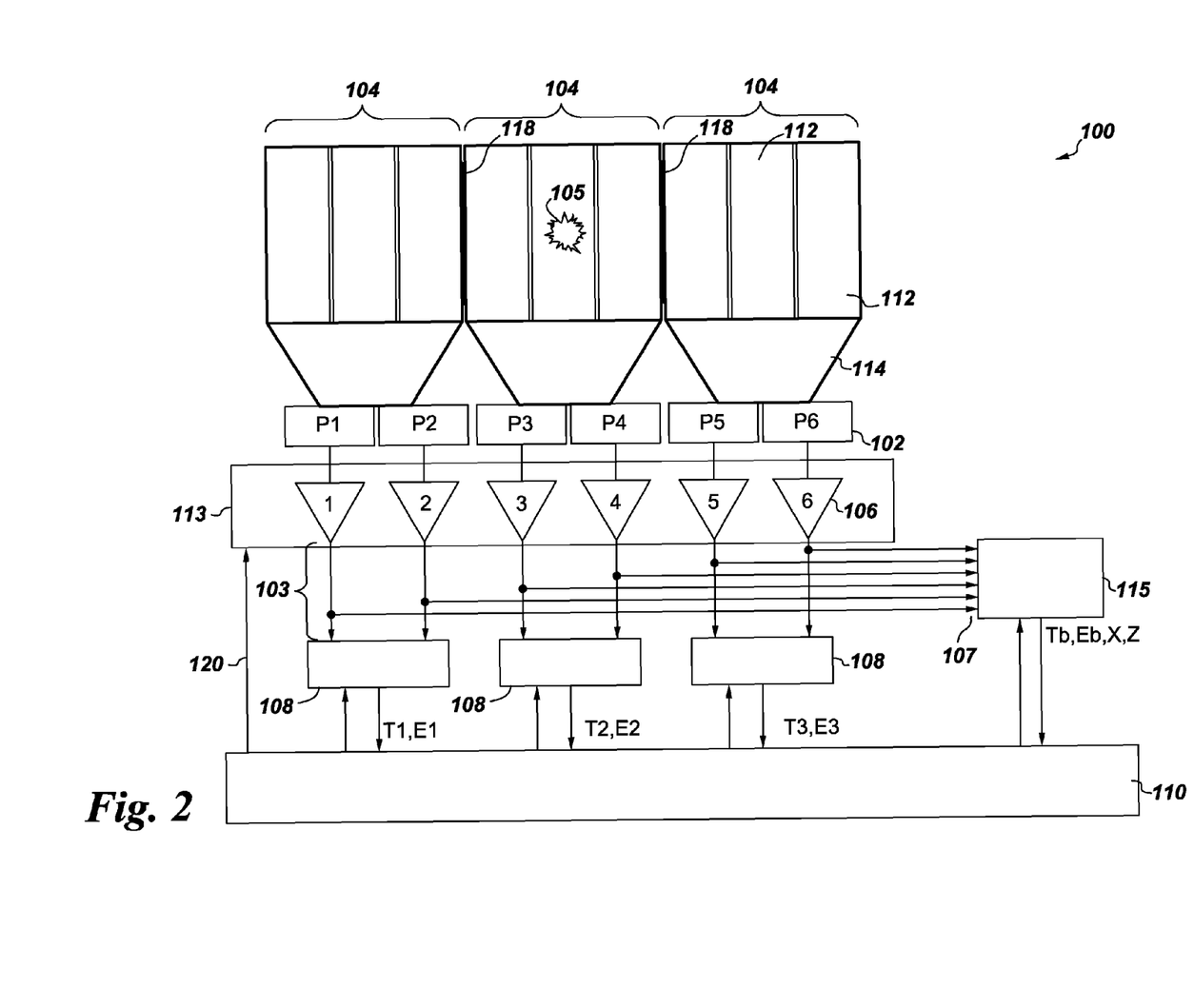
FIG. 2 depicts a perspective view of an embodiment of the present invention.

In one embodiment, as illustrated in FIG. 2, a detector block 100 is depicted. A plurality of detector blocks 100 can be configured in arrangement in a ring around the patient bore. As depicted in FIG. 2, the SiPM-based detector block 100 includes a plurality of SiPMs 102, scintillator crystals 112, light guides 114, a front end circuit 113, group readouts 108, and a block readout 115. The front end (FE) circuit 113 includes a plurality of buffer amplifiers 106, respectively coupled to the plurality of SiPMs 102 which can function as a current buffer. When a 511 keV annihilation photon is detected in the crystals 112, optical photons are generated. Light guides 114 collect the generated optical photons and guide them to SiPMs 102 to produce a current signal. Each buffer amplifier 106 provides both an output signal 107 to the block readout circuit 115 and output signal 103 to the respective group readout units 108; each buffer amplifier is connected to one or more group readout units.

The plurality of SiPMs 102 are arranged in groups to form sub-blocks 104, where a plurality of buffer amplifiers 106 respectively receive output signals of the plurality of SiPMs 102. In the sub-block 104, each buffer amplifier is coupled to at least one group readout unit 108 in which the signals 103 are summed and then processed by the readout unit including both timing channel (with short shaping time constant) and energy channel (with long shaping time constant) to provide timing (e.g. T1, T2, T3) and energy (e.g. E1, E2, E3) information to control and processing logic unit 110. In FIG. 2, the SiPM group readout configuration matches with the placement of a reflector 118. Each sub-block 104 corresponds to multiple crystals 112 which share optical photons of detected 511 keV annihilation photons in light guide 114 and are optically-isolated from crystals in other sub-blocks with the use of the reflector 118 (e.g., enhanced specular reflector (ESR), which prevents the optical photon crosstalk between sub-blocks. The gamma ray interaction 105 in the crystal is depicted here.

The SiPMs 102 within the block share block readout circuit 115, which provide energy (Eb), timing (Tb), and two-dimensional position (e.g., X position and Z position) information to the control & processing logic unit 110. In one embodiment, the group readout 108 could process noisy and slow signals generated by the SiPM to offer improved timing performance with a reduction in the number of readout channels. In one embodiment, the universal readout system, specifically the SiPM-based light sharing detector achieves improved timing performance while maintaining high sensitivity by recovering Compton scatter events between sub-blocks.

The group readout design having the benefits of reduced contribution of electronics noise, dark noise and optical crosstalk from other channels (i.e., sub-blocks), offers improved timing resolution. For Compton scatter events between sub-blocks, which deposit energy in more than one sub-block, the signals from each SiPM device 102 in the block are also summed together and then processed in block readout circuit 115 to provide timing (Tb) and energy (Eb) signals for further processing in the control and processing logic unit 110.

Figure 3A:
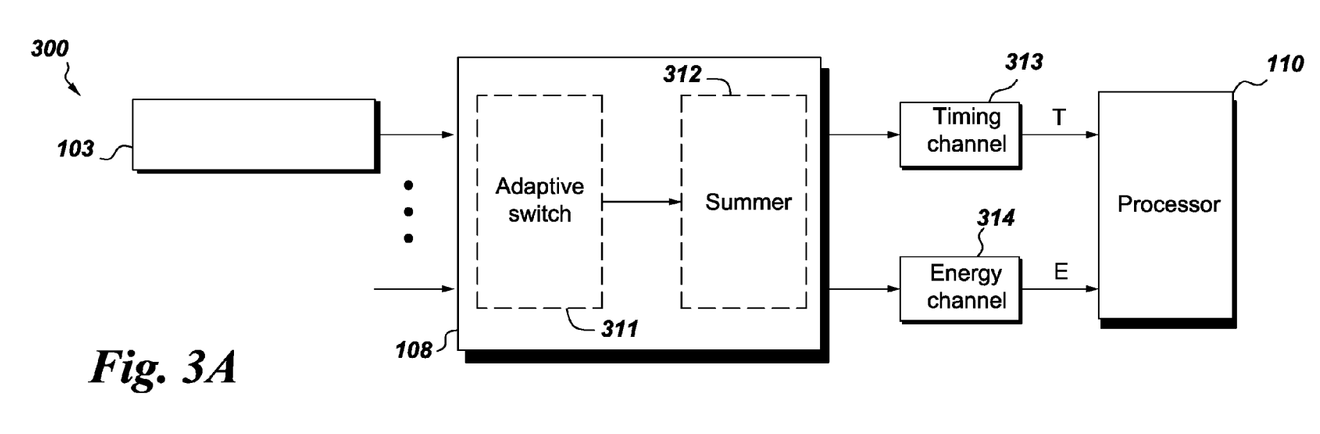
FIG. 3A depicts a schematic of adaptive group readout unit in accordance with one embodiment.

In one embodiment in FIG. 3A, a group (e.g. sub-block) readout unit 108 from FIG. 2 illustrates an adaptive switching. In group readout 108, the output signal 103 from the SiPM and the buffer is relayed to a summer 312 through an adaptive switch 311. A timing channel 313 and energy channel 314 is then communicated with the processor 110.

Figure 3B:
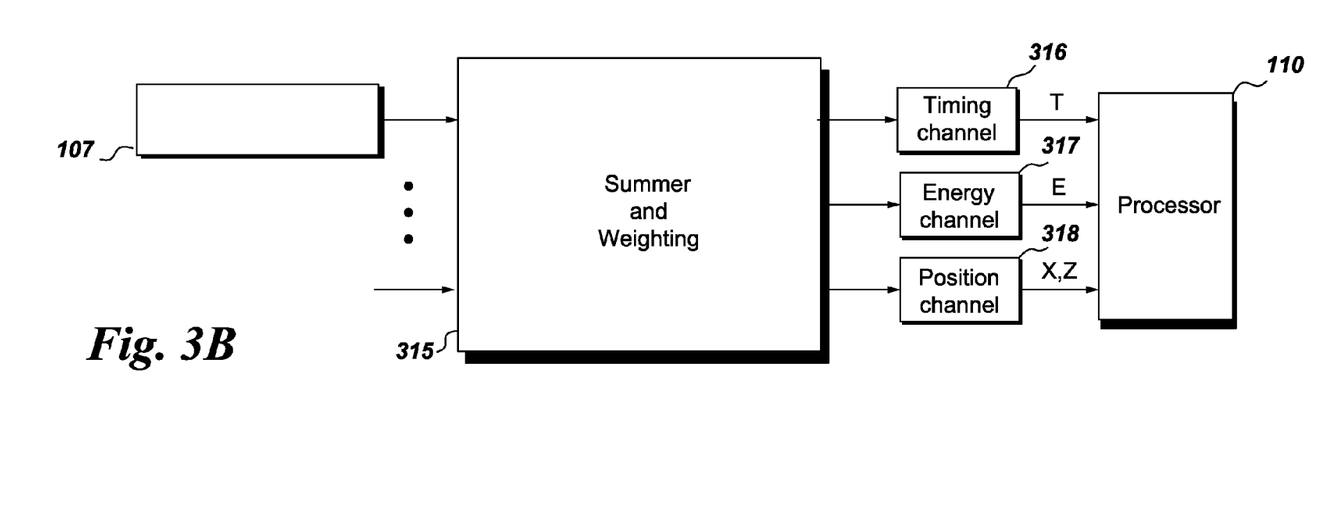
FIG. 3B depicts a schematic of a block readout circuit in one embodiment.

In one embodiment of the block readout circuit 115, as shown in FIG. 3B, the output signal 107 from the SiPM and the buffer is summed and/or weighted in the summer and weighting module 315 as desired, and then respectively processed in a timing channel 316, an energy channel 317, and a position channel 318 to offer timing, energy, and two-dimensional position information to the processor 110. In one aspect, the position designated may be one-dimensional, two-dimensional, or three-dimensional.

Figure 4A:
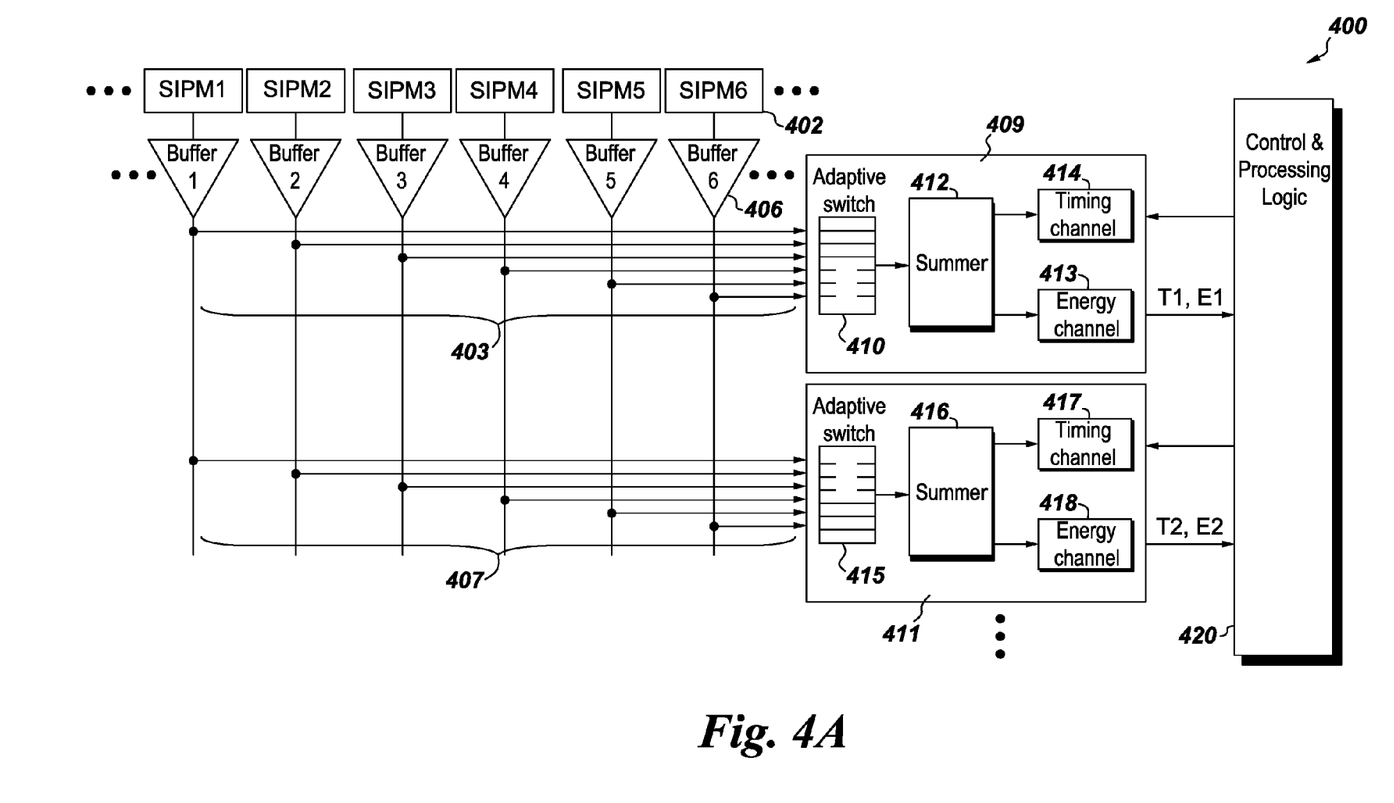
FIG. 4A depicts a perspective view of a group readout unit in accordance with an embodiment of the invention.

FIG. 4A illustrates the adaptive group readouts which are operated at a low count rate condition for system 400. The output of the SiPMs 402 (e.g., SiPM1, SiPM2 . . . etc.) is connected to each respective buffer 406 (e.g., Buffer 1, Buffer 2 . . . etc.), which then provides current signals 403 to group readout I (409) and current signals 407 to group readout II (411). In group readout I (409), the adaptive switch 410 is controlled by control & processing logic unit 420 to select the signals from designated SiPMs (e.g. SiPM/Buffer 1, 2, and 3), which are summed in the summer 412, and then processed in both a timing channel 414 and energy channel 413. The respective timing and energy signal (T1 and E1) are provided to the control and processing logic unit 420. The adaptive switch 415 in group readout II (411) selects the designated signal from SiPM/Buffer 4,5, and 6, and then process the summed signal in the timing channel 417 and energy channel 418 to provide timing and energy signal to the control and processing logic unit 420.

Figure 4B:
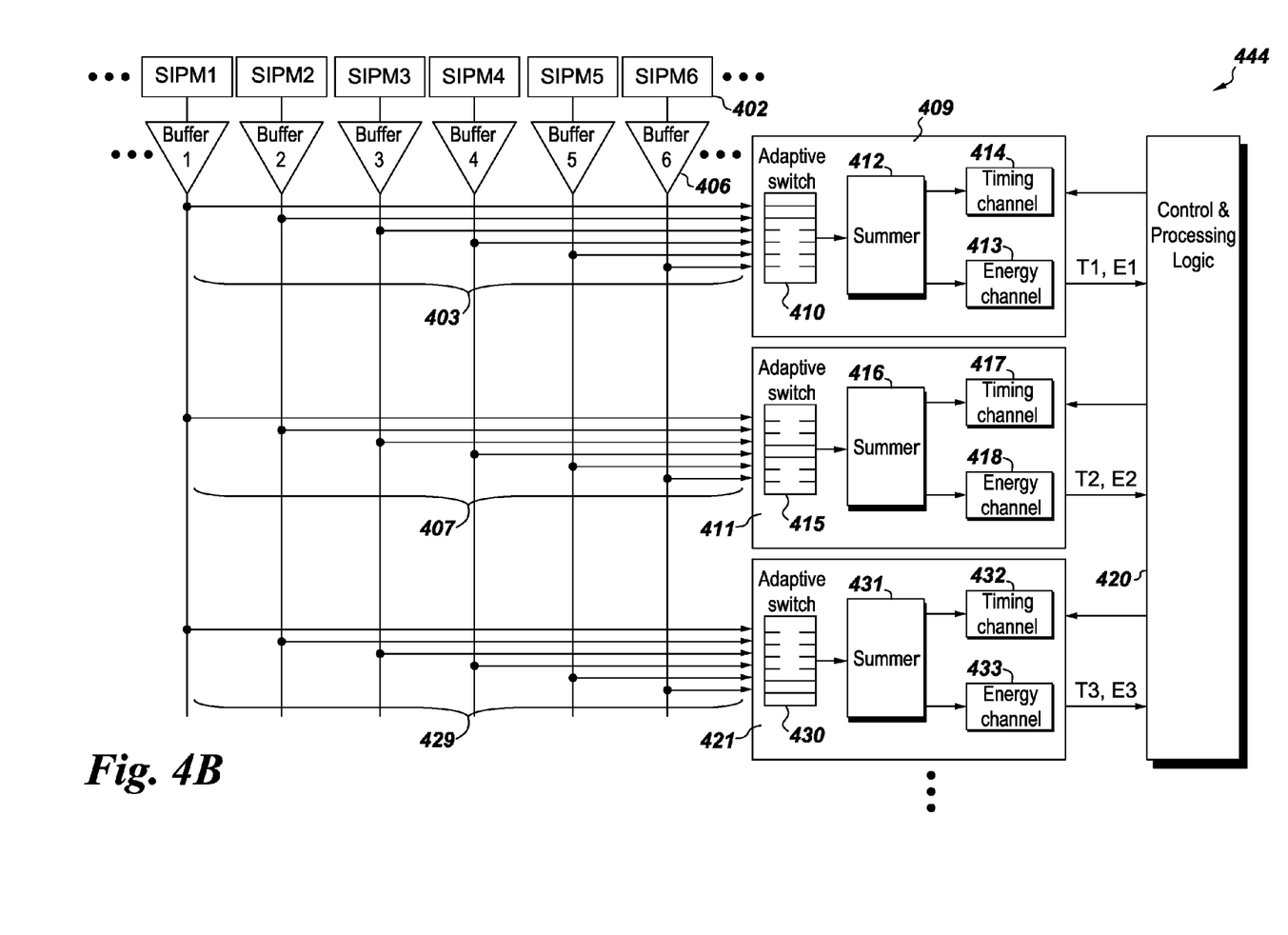
FIG. 4B depicts a perspective view of a group readout unit in accordance with one embodiment.

FIG. 4B illustrates the adaptive group readouts which are operated at a high count rate condition in system 444. The output of the SiPMs 402 (e.g., SiPM1, SiPM2 . . . etc.) is connected to each respective buffer 406 (e.g., Buffer 1, Buffer 2 . . . etc.), which then provides current signals 403 to group readout I (409), current signals 407 to group readout II (411), and current signals 429 to group readout III (421). In group readout I (409), the adaptive switch 410 is controlled by control & processing logic unit 420 such that the adaptive switch 410 of group readout I (409) selects a fewer number of buffers (e.g. SiPM/Buffer 1 and 2). Thus, while the group readout II (411) and the group readout III (421) collect the signal from SiPM/Buffer 3 and 4, and SiPM/Buffer 5 and 6 respectively.

Figure 5:
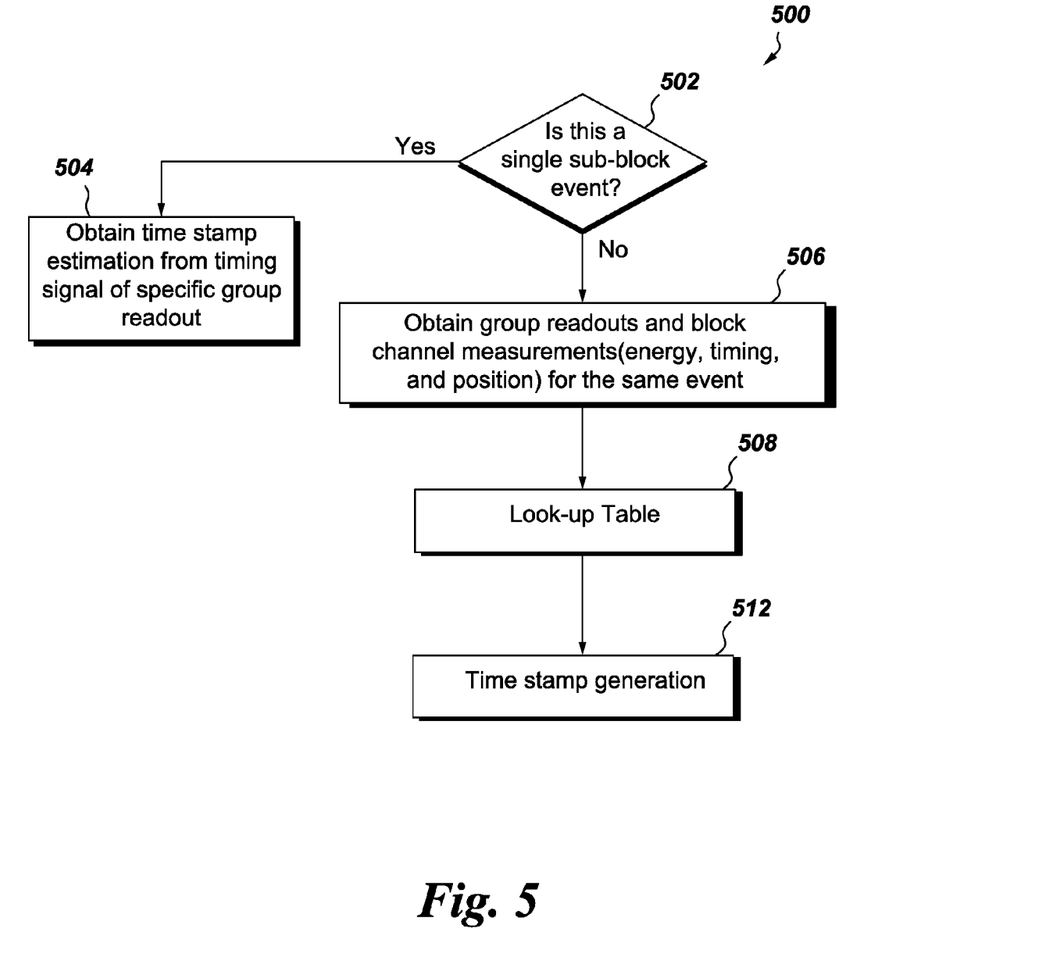
FIG. 5 illustrates a schematic flowchart in one aspect of the invention.

In one embodiment of FIG. 5, a flowchart illustrates a determination of the timing signal and improvement in the timing resolution (e.g., coincidence resolving time, (CRT)). The decision processing system 500 determines at a first step 502 whether or not a single sub-block (group) event has occurred. If yes, then a time stamp estimation 504 is obtained from the timing signal of the specific group readout. If no, then the signals from two of the group readout units are obtained along with the signals obtained from the block readout circuit (506) for the same event. In one aspect, signals from two group readout units are obtained, though signals from multiple group units, in any order and arrangement may be obtained.

These signals specifically comprising (i) an energy distribution, (ii) a spatial distance between one or more single or multiple group events (interactions), and (iii) an observed time difference between the events are checked with a look-up table (508) to determine the number of inputs and values to be used in calculating the weighted mean values of the time stamps (512). The look-up table can be pre-determined, as part of the processing unit. Multiple timing and energy signal pairs (N) from a single coincidence event are sent to the look-up table. The outputs of the look-up table are the selected timing and energy signal pairs to calculate the weighted mean timing stamp. In addition, the look-up table can include a pre-determined weighting factor and/or a selection strategy of the timing and energy signal pairs.

Since time signals $T_1$, $T_2$ from each group readout unit represent an independent measurement of the arrival time of the 511 keV annihilation photon, then a time stamp is calculated (512) as an average of two group timing signals, weighted by the inverse of each respective variance at respective energy depositions (E1 and E2). A weighted mean of the time stamp $T_{stamp}$ from two group timing signal can be expressed as shown in equation 1:

$$T_{stamp} = \frac{\sigma_2^2(E_2) * T_1 + \sigma_1^2(E_1) * T_2}{\sigma_1^2(E_1) + \sigma_2^2(E_2)} \quad (EQ. 1)$$

Figure 6:
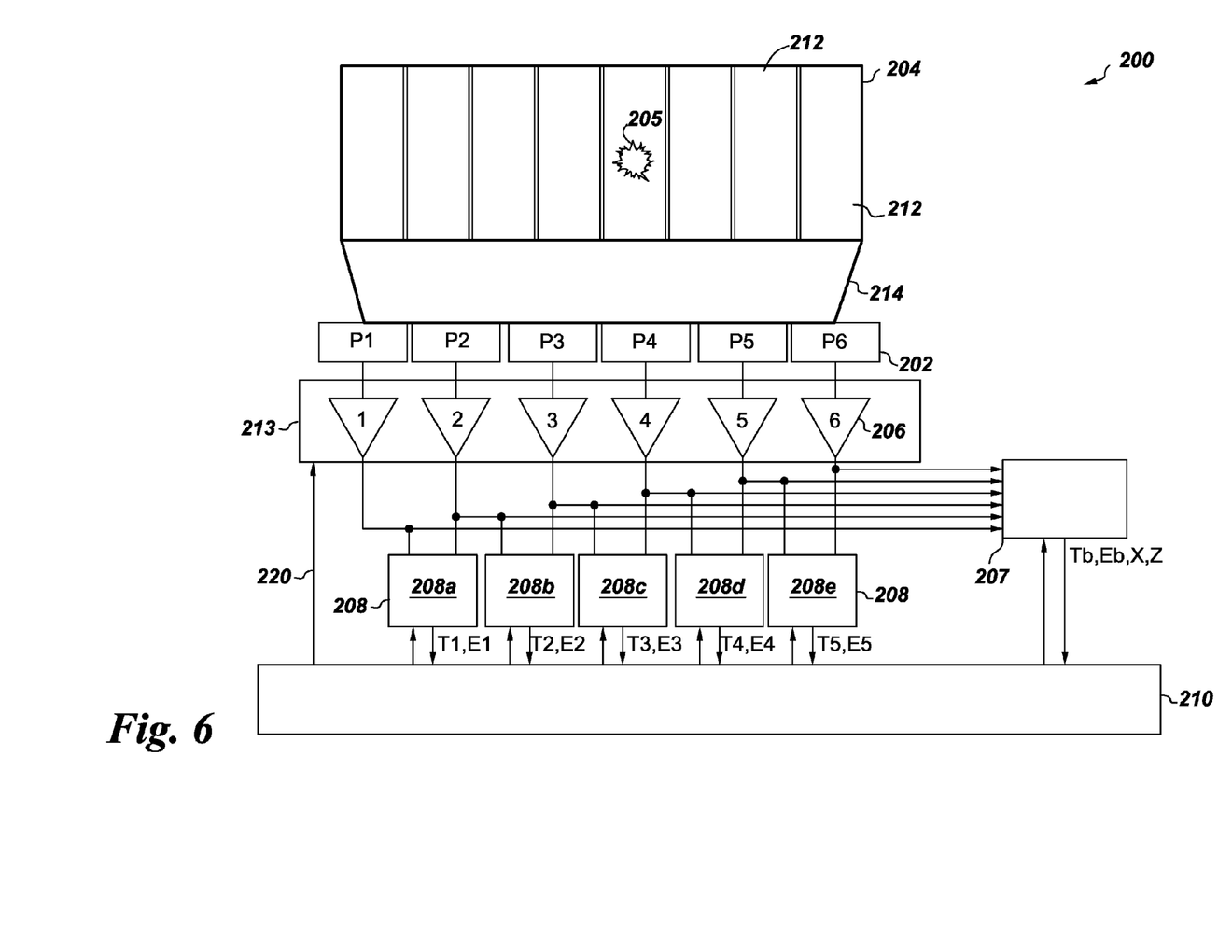
FIG. 6 illustrates a perspective view of one embodiment.

In FIG. 6, the detector block 200 is divided as several SiPM device groups regardless of the placement of reflectors. As depicted, a SiPM-based detector 200 includes a plurality of SiPMs 202 arranged in a unitary block 204; a plurality of buffer amplifiers 206 respectively coupled to the plurality of SiPMs 202; and a plurality of group readouts 208 (e.g., 208a, 208b, 208c, 208d, 208e), wherein each buffer amplifier within the input front-end circuit 213, is coupled to at least one group readout unit 208 in which the signals are summed and then processed by both timing channel, and energy channel to provide timing (e.g. T1-T5) and energy (e.g. E1-E5) signal to control and processing logic unit 210. A front-end control signal 220 is provided by the control and processing logic unit 210. For an individual gamma ray (e.g. 511 keV annihilation photon) event detected in the block 204, the optical photons are shared by multiple crystals 212 and thus light guide 214 and SiPM devices 202. To achieve a reasonable ratio of single group events, the group readout architecture may be configured to far greater than the light spreading (i.e., optical photon distribution) to collecting most of the optical photons in single readout group. This group readout provides the desired timing and energy information with reduced contribution of electronic noise, dark noise and optical crosstalk from other SiPMs, and thus offers improved timing resolution.

As shown in the system 200 of FIG. 6, the signals from each SiPM 202 in the scintillation block 204 are also summed together in block readout 207, and then processed to provide timing (Tb), energy (Eb), and position signal (X, Z) for further processing in control and processing logic unit 210. Moreover, during an individual gamma ray (e.g. 511 keV) event 205, the scintillation photons can be shared by multiple group readout units 208.

In summary, the methods disclosed in embodiments herein can process noisy (i.e., dark current), and slow signals generated by SiPM devices. The universal readout design includes adaptively multiplexing to greatly reduce the number of readout channels while maintaining a desired ratio of single group events and offering improved timing resolution for the SiPM-based detector with light-sharing configuration, Various embodiments of the invention may encompass any number of designs, shapes and sizes as discussed above. While individual embodiments have been thus described, the individual embodiments of the readout configuration may be integrated and combined for use in any light sharing system.

In one aspect, the configuration may be modified to utilize a complete readout electronic device for each SiPM. This design utilizes a plurality of readout channels, and consumes more power. Configurations that can be simplified and complexity minimized drive down cost and provide easier implementation.

In another aspect, the embodiments thus described utilize an SiPM in both 1:1 coupling (without light guide) or a light-sharing detector.

In accordance with some embodiments, a computer program application stored in non-volatile memory or computer-readable medium (e.g., register memory, processor cache, RAM, ROM, hard drive, flash memory, CD ROM, magnetic media, etc.) may include code or executable instructions that when executed may instruct and/or cause a controller or processor to perform methods discussed herein such as improving coincidence resolving time (CRT) in PET scanners using group channel and block channel data from a photomultiplier array, as described above.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and methods have been described herein, note that any number of other configurations may be provided in accordance with embodiments of the invention. Thus, while there have been shown, described, and pointed out fundamental novel features of the invention, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

While the invention has been described in considerable detail with reference to a few exemplary embodiments only, it will be appreciated that it is not intended to limit the invention to these embodiments only, since various modifications, omissions, additions and substitutions may be made to the disclosed embodiments without materially departing from the scope of the invention. In addition, many modifications may be made to adapt to a particular situation or an installation, without departing from the essential scope of the invention. Thus, it must be understood that the above invention has been described by way of illustration and not limitation. Accordingly, it is intended to cover all modifications, omissions, additions, substitutions or the like, which may be comprised within the scope and the spirit of the invention as defined by the claims.

The invention claimed is:

1. A silicon photomultiplier (SiPM) based detection system comprising:
   one or more SiPMs positioned in respect to one or more scintillation crystals to form a scintillation block, wherein the SiPMs detect an annihilation photon interaction in one or more of the scintillation crystals and produce one or more signals;
   a front end circuit including a plurality of buffer amplifiers, each buffer amplifier in communication with at least one respective SiPM to relay one or more of the signals to a plurality of group readout units;
   a block readout circuit coupled to the front end circuit, the block readout circuit of which selectively sums the signals from the plurality of buffer amplifiers;
   a control and processing logic unit which provides a control signal to the front end circuit, the group readouts, and the block readout circuit, alone or in combination, and which performs a time stamp estimation utilizing the one or more signals from each of the group readout units and block readout circuit, alone or in combination;
   wherein the signals from one or more of the buffer amplifiers are summed by way of a summer and provide a timing signal and an energy signal that represent the annihilation photon interaction in the group readout unit; and wherein the block readout circuit utilizes a summation of signals to provide a block timing signal, a block energy signal, and a position which represent the annihilation photon interaction in the scintillation block.

2. The SiPM based detection system of claim 1, further comprising one or more light guides positioned between the scintillation crystals and the SiPMs.

3. The SiPM based detection system of claim 1, wherein the position is a two-dimensional or three-dimensional position.

4. The SIPM based detection system of claim 1, wherein the group readout unit comprises an adaptive switch array to adaptively select signals from one or more selected buffer amplifiers.

5. The SiPM based detection system of claim 4, wherein the SiPMs are divided into a plurality of groups, each of said groups corresponding with multiple optically-coupled scintillation crystals and connected to a respective group readout circuit.

6. The SiPM based detection system of claim 4, wherein the selected buffer amplifiers in a group readout unit are determined based on optical photon distribution of the annihilation photon interaction detected in the scintillation block.

7. The SiPM based detection system of claim 1, wherein the timing signal is a time indication of an annihilation photon detected by selected SiPMs.

8. The SiPM based detection system of claim 1, wherein the energy signal provides a total energy deposition of annihilation photon interaction detected by selected SiPMs.

9. The SiPM based detection system of claim 1, wherein the block readout circuit comprises a weighted summer which sums the signals from the plurality of buffer amplifiers and provides a summed timing signal to a timing channel, a summed energy signal to an energy channel, and a weighted sum signal to a position channel; wherein
   the timing channel has a timing output that is a time indication of an annihilation photon interaction detected in the scintillation block;
   the energy channel provides an energy output that is a total energy deposition of an annihilation photon interaction detected in the scintillation block; and
   the position channel has an output signal that represents at least a two-dimensional position of the annihilation photon interaction detected in the block.

10. The SiPM based detection system of claim 1, wherein a reflector is positioned between groupings of scintillation crystals to optically isolate the scintillation block into sub-blocks.

11. The SiPM based detection system of claim 10, wherein the reflector is positioned between the sub-blocks and corresponding with one or more of the SiPMs to align with the group readout units.

12. A readout electronic apparatus comprising:
   a plurality of group readout units that receive signals from an arrangement of silicon photomultipliers (SiPMs) in combination with respective buffer amplifiers at a front end circuit, the SiPMs optically coupled to an array of scintillation crystals and which detect at least one annihilation photon event in one or more of the scintillation crystals;
   a block readout circuit coupled to the front end circuit, the block readout of which selectively sums the signals from the SiPMs;
   a control and processing logic unit which provides a control signal to the front end circuit, the group readout units, and the block readout circuit, alone or in combination, and which performs a time stamp estimation utilizing one or more of the signals from each of the group readout units and block readout circuit, alone or in combination;
   wherein the group readout unit comprises a summer to selectively sum the signals and provide a group timing signal and a group energy signal that represent the annihilation photon event and wherein the block readout circuit utilizes a selective summation of signals to provide a block timing signal, a block energy signal, and a position which represents the annihilation photon event.

13. The readout electronic apparatus of claim 12, wherein the group readout unit comprises one or more adaptive switches to adaptively select signals from one or more selected buffer amplifiers.

14. The readout electronic apparatus of claim 12, wherein a selection of SiPMs and buffer amplifiers in the group readout unit is determined by a count rate of the annihilation photon event.

15. The readout electronic apparatus of claim 14, wherein the group readout unit selects a fewer number of SiPMs and corresponding buffer amplifiers when the count rate has a specified high count rate; and wherein the group readout unit selects a larger number of SiPMs and corresponding buffer amplifiers the count rate has a specified low count rate.

16. The readout electronic apparatus of claim 12, wherein the array of scintillation crystals are organized into sub-blocks and the block readout circuit is utilized to recover Compton scatter events between the sub-blocks to improve sensitivity.

17. The readout electronic apparatus of claim 12, wherein the control and processing logic unit performs at least one time stamp estimation to determine timing of the annihilation photon event.

18. The readout electronic apparatus of claim 12, wherein the summed energy signal of the block readout circuit indicates an energy level of the annihilation photon event, and wherein the group readout unit comprises an energy channel that represents a summed deposition of energy in an individual group readout unit.

19. A method of providing universal readout in a silicon photomultiplier (SiPM) based detector, the method comprising:
    detecting a radiation event using one or more silicon photomultipliers (SiPMs) in a scintillation block;
    determining, by way of a processor, if the radiation event is a single group event or a multiple group event;
    obtaining one or more time stamps from one or more timing signals of the single group event or the multiple group event and recording inputs in a look-up table, the inputs comprising (i) an energy distribution, (ii) a spatial distance between one or more single or multiple group events, and (iii) an observed time difference between the events;
    determining, by way of the look-up table, a number of inputs and set of values including a weighting factor;
    calculating weighted time values which, by way of the look-up table, create an optimized mean of the time stamps.

20. The method of claim 19, wherein the step of calculating the weighted time values an energy disposition associated with each of the single or multiple group events is estimated, and the optimized mean of the time stamps is weighted by an inverse of each respective group variance.

21. A non-transitory computer readable medium comprising computer-readable instructions stored therein for causing a control processor to perform operations to determine timing, energy, and a position in a group readout configuration, the operations comprising:
    detecting a radiation event using one or more silicon photomultipliers (SiPMs) in a scintillation block;
    determining, by way of a processor, if the radiation event is a single group event or a multiple group event;
    obtaining one or more time stamps from one or more timing signals of the single group event or the multiple group event and recording inputs in a look-up table, the inputs comprising (i) an energy distribution, (ii) a spatial distance between one or more single or multiple group events, and (iii) an observed time difference between the events;
    determining, by way of the look-up table, a number of inputs and set of values that optimize the timing signals;
    calculating weighted time values which, by way of the look-up table, create an optimized mean of the time stamps.

* * * * *